(12) United States Patent
Long et al.

(10) Patent No.: US 9,996,200 B2
(45) Date of Patent: Jun. 12, 2018

(54) TOUCH SCREEN, DISPLAY DEVICE AND MANUFACTURING METHOD THEREOF USABLE FOR REALIZING 3D DISPLAY

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Jun Long, Beijing (CN); Junguo Liu, Beijing (CN); Hao Wu, Beijing (CN); Rui Li, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 294 days.

(21) Appl. No.: 14/348,133

(22) PCT Filed: Jun. 27, 2013

(86) PCT No.: PCT/CN2013/078206
§ 371 (c)(1),
(2) Date: Mar. 28, 2014

(87) PCT Pub. No.: WO2014/173000
PCT Pub. Date: Oct. 30, 2014

(65) Prior Publication Data
US 2016/0132144 A1    May 12, 2016

(30) Foreign Application Priority Data

Apr. 27, 2013    (CN) .......................... 2013 1 0152906

(51) Int. Cl.
*G06F 3/045*    (2006.01)
*G06F 3/044*    (2006.01)
(Continued)

(52) U.S. Cl.
CPC ............ *G06F 3/044* (2013.01); *G06F 3/0412* (2013.01); *H04N 13/04* (2013.01); *G06F 2203/04103* (2013.01)

(58) Field of Classification Search
CPC ................... G06F 3/044; G06F 3/0412; G06F 2203/04103; H04N 13/04; H04N 13/0404;
(Continued)

(56) References Cited

U.S. PATENT DOCUMENTS 8,384,685 B2 *   2/2013   Kuo ................... H04N 13/0409
                                                        178/18.01
8,587,556 B2 *   11/2013  Luo .................... G02B 27/2214
                                                          345/174

(Continued)

FOREIGN PATENT DOCUMENTS

CN         102692748 A       9/2012
CN         102707514 A       10/2012
(Continued)

OTHER PUBLICATIONS

First Chinese Office Action Appln. No. 201310152906.0, dated Jun. 17, 2015.
(Continued)

*Primary Examiner* — Peter D McLoone
(74) *Attorney, Agent, or Firm* — Ladas & Parry LLP

(57) ABSTRACT

Embodiments of the invention relate to a touch screen, a display device and manufacturing method thereof being usable for realizing 3D display. The touch screen comprises: an upper substrate and a lower substrate cell-assembled; and (Continued)

liquid crystal, filled between the upper substrate and the lower substrate, wherein the upper substrate comprises: an upper transparent substrate and a transparent conductive layer disposed on the upper transparent substrate, i.e. on a side of the upper transparent substrate facing the lower substrate; the lower substrate comprises: a lower transparent substrate and a first sensing electrode layer, an insulating layer and a second sensing electrode layer sequentially disposed on the lower transparent substrate, i.e. on a side of the lower transparent substrate facing the upper substrate, wherein the first sensing electrode layer comprises a plurality of first sensing electrodes, the second sensing electrode layer comprises a plurality of second sensing electrodes that cross over the first sensing electrodes, and the insulating layer is configured to insulate the first sensing electrodes and the second sensing electrodes, to thus form touch sensing capacitors.

11 Claims, 1 Drawing Sheet

(51) Int. Cl.
*G06F 3/041* (2006.01)
*H04N 13/04* (2006.01)

(58) Field of Classification Search
CPC ........... H04N 13/0452; H04N 13/0454; H04N 13/0409; G02B 27/2214; G02F 1/13338
See application file for complete search history.

(56) References Cited

U.S. PATENT DOCUMENTS

| | | | | |
|---|---|---|---|---|
| 8,687,135 | B2* | 4/2014 | Son | G02F 1/13338 349/12 |
| 8,791,919 | B2* | 7/2014 | Cheng | H04N 13/0452 345/173 |
| 8,836,634 | B2* | 9/2014 | Lee | G02B 27/2264 345/102 |
| 8,976,137 | B2* | 3/2015 | Goo | G02F 1/13338 345/173 |
| 9,058,780 | B2* | 6/2015 | Sumi | G09G 3/003 |
| 9,075,469 | B2* | 7/2015 | Son | G02F 1/13338 |
| 9,135,845 | B2* | 9/2015 | Lee, II | G09G 3/003 |
| 9,188,787 | B2* | 11/2015 | Wu | G02B 27/22 |
| 2009/0002336 | A1* | 1/2009 | Choi | G06F 3/044 345/174 |
| 2010/0033668 | A1* | 2/2010 | Koito | G02F 1/13338 349/155 |
| 2011/0096251 | A1* | 4/2011 | Son | G02F 1/13338 349/15 |
| 2011/0109622 | A1* | 5/2011 | Son | G02F 1/13338 345/419 |
| 2012/0081330 | A1* | 4/2012 | Park | G06F 3/0412 345/174 |
| 2012/0105434 | A1* | 5/2012 | Kuo | H04N 13/0409 345/419 |
| 2012/0169648 | A1* | 7/2012 | Luo | G02B 27/2214 345/174 |
| 2012/0242615 | A1* | 9/2012 | Teraguchi | G06F 3/0412 345/174 |
| 2012/0327349 | A1* | 12/2012 | Wang | G02F 1/13338 349/139 |
| 2013/0033440 | A1* | 2/2013 | Cheng | H04N 13/0452 345/173 |
| 2013/0215076 | A1* | 8/2013 | Lee | G09G 3/003 345/174 |
| 2013/0271388 | A1* | 10/2013 | Chu | G06F 3/0412 345/173 |
| 2013/0300705 | A1* | 11/2013 | Goo | G02F 1/13338 345/174 |
| 2014/0111470 | A1* | 4/2014 | Wu | G02F 1/134309 345/174 |
| 2014/0125887 | A1* | 5/2014 | Wu | G02B 27/22 349/12 |
| 2014/0184943 | A1* | 7/2014 | Yang | G02F 1/13338 349/12 |
| 2014/0253490 | A1* | 9/2014 | Sumi | G09G 3/003 345/174 |
| 2014/0375905 | A1* | 12/2014 | Chang | G06F 3/0412 349/12 |
| 2015/0160495 | A1* | 6/2015 | Yang | G02B 27/2264 349/12 |

FOREIGN PATENT DOCUMENTS

| | | |
|---|---|---|
| CN | 102707515 A | 10/2012 |
| JP | 2006-285785 A | 10/2006 |
| KR | 100824539 B1 | 4/2008 |
| KR | 20120077451 A | 7/2012 |

OTHER PUBLICATIONS

International Search Report dated Jan. 30, 2014; PCT/CN2013/078206.
International Preliminary Report on Patentability dated Oct. 27, 2015: PCT/CN2013/078206.

* cited by examiner

TOUCH SCREEN, DISPLAY DEVICE AND MANUFACTURING METHOD THEREOF USABLE FOR REALIZING 3D DISPLAY

TECHNICAL FIELD

Embodiments of the present invention relate to a touch screen, a display device and a manufacturing method thereof being usable for realizing 3D display.

BACKGROUND

In recent years, stereoscopic display, i.e. 3D (three-dimensional) display, has become a big trend in the field of display. As compared with the common two-dimensional display, the 3D display allows an image to become stereoscopic and realistic. Although there are many kinds of 3D display technologies, the most basic principles are similar, that is, to make different images having a parallax respectively received by left and right eyes of a person, and to superimpose the different two-dimensional images in his brain and then to regenerated so as to form a 3D stereoscopic image.

The 3D stereoscopic display is mainly classified into a naked-eye type and a glasses type. The glasses-type 3D display requires wearing of a special glasses, and this causes its application scope and use comfort level to be reduced greatly. An existing naked-eye 3D display device is mainly composed of a display panel and a parallax barrier grating, in which, the parallax barrier grating comprises a plurality of grating units, and is placed in front of the display panel in a certain way, and after an image separation is performed by the parallax barrier grating, different visual images can be seen by two eyes of a person, so as to realize a stereoscopy.

SUMMARY

According to embodiments of the invention, there are provided a touch screen, a display device and a manufacturing method thereof being usable for realizing a 3D display. With the touch screen, a display image can be switched between a 2D mode and a 3D mode.

According to an embodiment of the invention, there is provided a touch screen usable for realizing 3D display, comprising: an upper substrate and a lower substrate cell-assembled; and liquid crystal, filled between the upper substrate and the lower substrate, wherein the upper substrate comprises: an upper transparent substrate and a transparent conductive layer disposed on the upper transparent substrate, i.e. on a side of the upper transparent substrate facing the lower substrate; the lower substrate comprises: a lower transparent substrate and a first sensing electrode layer, an insulating layer and a second sensing electrode layer sequentially disposed on the lower transparent substrate, i.e. on a side of the lower transparent substrate facing the upper substrate, wherein the first sensing electrode layer comprises a plurality of first sensing electrodes, the second sensing electrode layer comprises a plurality of second sensing electrodes that cross over the first sensing electrodes, and the insulating layer is configured to insulate the first sensing electrodes and the second sensing electrodes, to thus form touch sensing capacitors.

Optionally, the transparent conductive layer is of a flat plate shape or a strip shape.

Optionally, the strip-like transparent conductive layer corresponds to the second sensing electrodes of the lower substrate in position.

Optionally, the transparent conductive layer has a plurality of protrusions at locations where the transparent conductive layer directly corresponds to the second sensing electrodes of the lower substrate.

Optionally, both the first sensing electrodes and the second sensing electrodes are of strip-like electrodes.

Optionally, the first sensing electrodes are perpendicular to the second sensing electrodes.

Optionally, the upper substrate further comprises an insulating layer, and the transparent conductive layer is disposed between the insulating layer and the upper transparent substrate.

Optionally, the lower substrate further comprises an alignment layer, and the first sensing electrode layer, the insulating layer and the second sensing electrode layer are disposed between the alignment layer and the lower transparent substrate in this order.

A manufacturing method for manufacturing the touch screen provided by any of embodiments of the invention, comprising: manufacturing a transparent conductive layer on an upper transparent substrate, so as to attain an upper substrate; manufacturing a first sensing electrode layer, an insulating layer and a second sensing electrode layer on a lower transparent substrate in sequence, so as to attain a lower substrate; cell-assembling the upper substrate and the lower substrate to form a cell and filling liquid crystal into the cell, so that the touch screen is formed, wherein a side of the upper transparent substrate on which the transparent electrode layer is formed faces a side of the lower transparent substrate on which the first sensing electrode layer, the insulating layer and the second sensing electrode layer are formed.

Optionally, the manufacturing the transparent conductive layer on the upper transparent substrate so as to attain the upper substrate further comprises: providing an insulating layer on the transparent conductive layer of the upper transparent substrate.

Optionally, the manufacturing the first sensing electrode layer, the insulating layer and the second sensing electrode layer on the lower transparent substrate so as to attain the lower substrate further comprises: providing an alignment layer on the lower transparent substrate on which the first sensing electrode layer, the insulating layer and the second sensing electrode layer are formed.

According to an embodiment of the invention, there is further provided a display device, comprising the touch screen provided by any of embodiments of the invention.

A manufacturing method of the display device, comprising: manufacturing the touch screen by a manufacturing method provided by embodiments of the invention; and attaching the touch screen to a light exiting side of a display panel.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Figure 1:
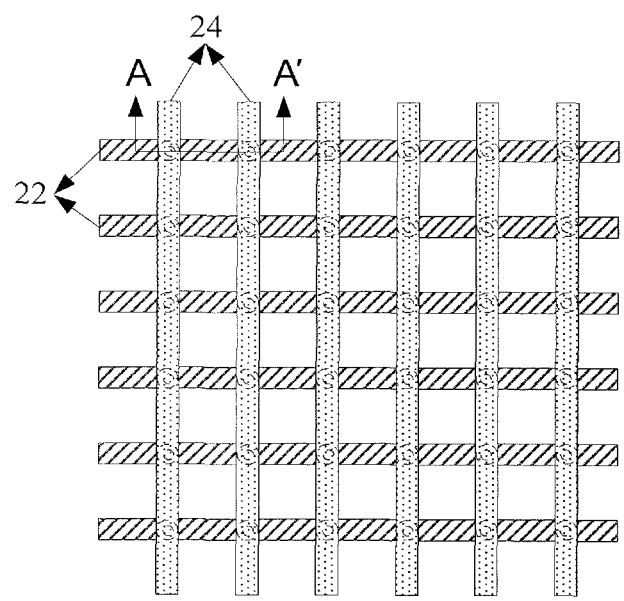
FIG. 1 is a top view illustrating a part of components of a touch screen having a 3D display function provided by an embodiment of the invention.
Figure 2:
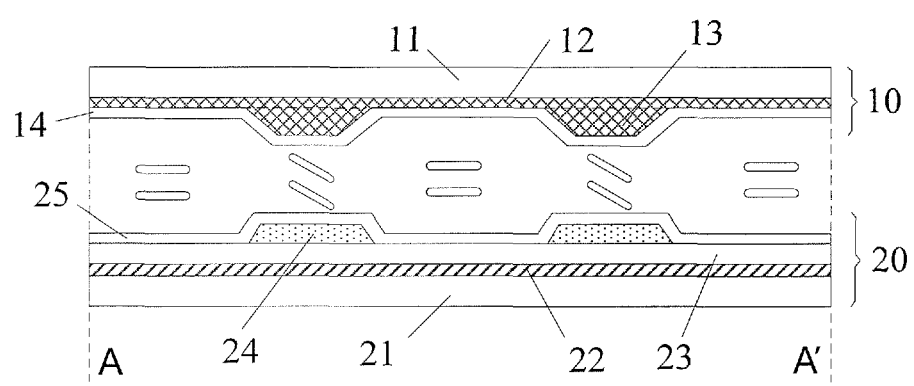
FIG. 2 is a structural cross-sectional schematic view taken along A-A' of the touch screen shown in FIG. 1.

According to an embodiment of the invention, there is provided a touch screen being usable for realizing 3D display. As shown in FIG. 1 and FIG. 2, it comprises an upper substrate 10 and a lower substrate 20 cell-assembled and liquid crystal being filled between the upper substrate 10 and the lower substrate 20, wherein, the upper substrate 10 comprises: an upper transparent substrate 11 and a transparent conductive layer 12 disposed on the upper transparent substrate 11, i.e. on a side of the upper transparent substrate 11 facing the lower substrate 20; the lower substrate 20 comprises: a lower transparent substrate 21 and a first sensing electrode layer, an insulating layer 23 and a second sensing electrode layer sequentially disposed on the lower transparent substrate 21, i.e. on a side of the lower transparent substrate 21 facing the upper substrate 10, wherein, the first sensing electrode layer comprises a plurality of first sensing electrodes 22, the second sensing electrode layer comprises a plurality of second sensing electrodes 24 that cross over the first sensing electrodes, and the insulating layer 23 acts to make the first sensing electrodes 22 being insulated from the second sensing electrodes 24, to thereby form touch sensing capacitors.

It is to be noted that, in the embodiments of the invention, the upper substrate is a substrate being closer to the human eyes, and the lower substrate is a substrate located farther away from the human eyes. Further, as the first sensing electrodes and the second sensing electrodes may affect amount of transmitted light, the closer to a light source or a display panel the first sensing electrodes and the second sensing electrodes are located, the greater the amount of the transmitted light is, and the higher the display brightness is. In the same way, the farther from the light source or the display panel the first sensing electrodes and the second sensing electrodes are located, the lesser the amount of the transmitted light is, and the lower the display brightness is. The first sensing electrodes and the second sensing electrodes on the lower substrate can be configured to sense and position a location of a contact, so as to realize a touch function. For example, when a human's finger touches a display screen, a slight deformation will occur in the display screen due to press of the finger, so that a capacitance between the transparent conductive layer and a second sensing electrode will change, and in turn, a capacitance between a first sensing electrode and the second sensing electrode will change. The location of the touch is positioned through use of the first sensing electrodes and the second sensing electrodes, and then the touch function is realized through connecting them to an external chip.

When a power has not been applied to the transparent conductive layer on the upper substrate, the touch screen is transparent, so that a 2D display can be realized. When the power has been applied to the transparent conductive layer on the upper substrate, a vertical electric field is formed between the transparent conductive layer and the second sensing electrodes of the lower substrate, so that regions between the transparent conductive layer and the second sensing electrode form as light-shielding regions, and regions between two adjacent second sensing electrodes form as light-transmitting region, and thus, alternate bright and dark stripes are formed, and the 3D display can be realized.

Regarding the touch screen provided by embodiments of the invention, when the first sensing electrodes and the second sensing electrodes of the lower substrate of the touch screen are electrified and the transparent conductive layer of the upper substrate is not electrified, the 2D display can be realized. When the first sensing electrodes and the second sensing electrodes of the lower substrate of the touch screen and the transparent conductive layer of the upper substrate all are electrified, an electric field is formed between the transparent conductive layer and the second sensing electrodes, so that the regions between the transparent conductive layer and the second sensing electrode form as light-shielding regions, and the regions between two adjacent second sensing electrodes form as light-transmitting region, and thus, alternate bright and dark stripes are formed, and the 3D display can be realized.

Optionally, the transparent conductive layer may be of a flat plate shape or a strip shape. An electric field is formed between the transparent conductive layer and the second sensing electrodes, so as to take control of liquid crystal to shield light at locations where the transparent conductive layer faces the second sensing electrode for formation of dark stripes, and at locations between two adjacent second sensing electrodes, the light is transmitted to form bright stripes, and thus, alternate bright and dark stripes are formed. Further, when the transparent conductive layer is of the strip shape, the strip-like transparent conductive layer corresponds to the second sensing electrodes of the lower substrate in position, for example, the strip-like transparent conductive layer directly corresponds to the second sensing electrodes of the lower substrate in position. That is to say, the transparent conductive layer is only provided at locations facing the second sensing electrodes.

Optionally, as shown in FIG. 2, the transparent conductive layer 12 has a plurality of protrusions 13 at locations where the transparent conductive layer 12 directly corresponds to the second sensing electrodes 24 of the lower substrate 20. By providing the protrusions 13, change in capacitance between the transparent conductive layer and the second sensing electrode at a touch location of a finger can be made to be more obvious, and thus, the touch function can be realized more easily. Further, the protrusions may be circular bosses.

Optionally, both the first sensing electrodes and the second sensing electrodes are strip-like electrodes. Exemplarily, as shown in FIG. 1, both the first sensing electrodes and the second sensing electrodes are strip-like electrodes, and the first sensing electrodes are perpendicular to the second sensing electrodes. A touch location of a finger can be positioned through use of the first sensing electrodes and the second sensing electrodes, so that a touch function is realized. The principle to realize the touch function through use of the first sensing electrodes and the second sensing electrodes is the same as that in prior art, and details are omitted here.

Optionally, as shown in FIG. 2, the upper substrate 10 further comprises an insulating layer 14, and the transparent conductive layer 12 is disposed between the insulating layer 14 and the upper transparent substrate 11. The insulating layer is insulative, and when the transparent conductive layer is in a strip shape, the insulating layer can also be used to flatten layers on the substrate.

Optionally, as shown in FIG. 2, the lower substrate 20 further comprises an alignment layer 25, and the first sensing electrode layer, the insulating layer and the second sensing electrode layer are disposed between the alignment layer 25 and the lower transparent substrate 21. Exemplarily, as shown in FIG. 2, the lower substrate 20 is further provided with the alignment layer 25 on top of the second sensing electrodes 24. It is to be noted that, in embodiments of the invention, the "upper" and "lower" are defined based on a forming order thin films. For example, a thin film fabricated firstly is underneath, and a thin film fabricated later is on top. With the alignment layer, grooves are formed in a surface of a PI (Polyimide) thin film after friction. A density of the grooves in the alignment layer affects anchoring force of liquid crystal, and the larger the density of the grooves is, the stronger the anchoring force of the liquid crystal is; on the contrary, the smaller the density of the grooves is, the weaker the anchoring force of the liquid crystal is.

It is to be noted that, for the touch screen provided by embodiments of the invention, only its main parts related to an inventive concept of the invention are listed in embodiments of the invention, and as regards other parts or components in the touch screen irrelevant to the inventive concept of the invention, they may refer to the prior art. For example, in order to achieve the touch function, the first sensing electrodes and the second sensing electrodes are usually connected with a processing chip, and this will not be described in detail in embodiments of the invention owing to its irrelevance to the inventive concept of the invention, despite the fact that it is a basic condition to achieve the touch function.

According to an embodiment of the invention, there is provided a method for manufacturing any of the touch screens provided by embodiments of the invention, comprising:

Step S101, forming a transparent conductive layer on an upper transparent substrate, so as to attain an upper substrate.

Exemplarily, the upper transparent substrate may be a glass substrate, and may also be a plastic substrate or the like, and the transparent conductive layer may be formed by sputtering a transparent conductive material, such as ITO (Indium Tin Oxide) material. Alternatively, the transparent conductive layer may be formed by forming a transparent conductive thin film using a depositing process on the transparent substrate and then by using a patterning process. The so-called "patterning process" is a process in which a thin film is formed into a layer comprising at least one pattern; and the patterning process generally comprises: coating a photoresist on the thin film, exposing the photoresist by using a mask, and then developing the photoresist by using a developer, then etching off a portion of the thin film not covered by the photoresist, and finally, stripping the remaining photoresist. For example, the transparent conductive layer is in a strip shape, and strip patterns can be formed by one patterning process. As regards the specific formation of the transparent conductive layer through one patterning process, it may refer to a manufacturing process in prior art, details is omitted in embodiments of the invention.

Step S102, forming a first sensing electrode layer, an insulating layer and a second sensing electrode layer on a lower transparent substrate in sequence, so as to attain a lower substrate.

Exemplarily, the lower transparent substrate may be a glass substrate, and may also be a plastic substrate or the like, and the first sensing electrode layer, the insulating layer and the second sensing electrode layer may be formed on the lower transparent substrate by means of sputtering materials. Wherein, the material to form the first sensing electrode layer and the second sensing electrode layer may be ITO or the like, and the material to form the insulating layer may be silicon nitride or the like. Alternatively, the first sensing electrode layer, the insulating layer and the second sensing electrode layer may be formed on the lower substrate by a respective patterning process. An existing manufacturing method may be referred to, and details will be omitted in embodiments of the invention.

Step S103, cell-assembling the upper substrate and the lower substrate to form a cell and injecting liquid crystal into the cell, so as to form the touch screen, wherein, a side of the upper substrate on which the transparent electrode layer is formed faces a side of the lower substrate on which the first sensing electrode layer, the insulating layer and the second sensing electrode layer are formed.

Exemplarily, as shown in FIG. 2, a side of the upper substrate on which the transparent conductive layer is disposed and a side of the lower substrate on which the first sensing electrode layer, the insulating layer and the second sensing electrode layer are disposed face to each other.

Optionally, the forming the transparent conductive layer on the upper transparent substrate so as to attain the upper substrate further comprises: providing an insulating layer on the upper transparent substrate.

Exemplarily, as shown in FIG. 2, an insulating layer 14 on the upper transparent substrate is disposed above the transparent conductive layer 12.

Optionally, the forming the first sensing electrode layer, the insulating layer and the second sensing electrode layer on the lower transparent substrate so as to attain the lower substrate further comprises: providing an alignment layer on the lower transparent substrate. Herein, the alignment layer is disposed above the second sensing electrodes. In the case that the alignment layer is formed on the second sensing electrodes, liquid crystal molecules are arranged along an aligning direction of the alignment layer.

Optionally, the first sensing electrode layer comprises a plurality of first sensing electrodes, the second sensing electrode layer comprises a plurality of second sensing electrodes that cross over the first sensing electrodes, and the first sensing electrodes are perpendicular to the second sensing electrodes. A contact location of a finger can be positioned through use of the first sensing electrodes and the second sensing electrodes, so as to realize the touch function.

The transparent conductive layer formed on the upper transparent substrate may be in the shape of a flat plate or a strip. When the transparent conductive layer is in a strip shape, the transparent conductive layer corresponds to the second sensing electrodes on the lower substrate, for example, the transparent conductive layer directly corresponds to the second sensing electrodes of the lower substrate in position.

Optionally, the forming the transparent conductive layer on the upper transparent substrate so as to attain the upper substrate further comprises further comprises: forming a plurality of protrusions at locations where the transparent conductive layer 12 directly corresponds to the second sensing electrodes 24 of the lower substrate 20.

Exemplarily, the protrusions are formed into circular bosses.

According to an embodiment of the invention, there is further provided a display device, comprising any of the touch screens provided by embodiments of the invention. The display device may be applied to a television, an electronic paper, a digital camera, a digital photoframe, a computer and any other products having a display function.

According to an embodiment of the invention, there is further provided a manufacturing method of a display device, comprising:

Step S201, manufacturing a touch screen usable for realizing 3D display.

The manufacturing the touch screen usable for realizing 3D display may be based on any of the methods for manufacturing the touch screen provided by embodiments of the invention and may refer to the step S101 to step S103 as well as other embodiments of the invention.

Step S202, attaching the touch screen and a display panel, wherein the touch screen is attached to a light exiting side of the display panel.

It is to be noted that, the display panel may comprise a LCD display panel, an OLED display panel, an electronic paper panel, or other display panel.

With respect to a touch screen, a display device and a manufacturing method thereof being usable for realizing 3D display provided by embodiments of the invention, a transparent conductive layer is provided on an upper substrate of the touch screen. When no power is applied to the transparent conductive layer, a 2D display can be realized by the touch screen. When a power is applied to the transparent conductive layer, a vertical electric field is formed between it and second sensing electrodes on a lower substrate, so that light is shielding at locations where the transparent conductive layer faces the second sensing electrodes, and regions between two adjacent second sensing electrodes are light-transmitting region. Then, alternate bright and dark stripes are formed on the display screen, so that 3D display can be realized.

The embodiment of the invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

The invention claimed is:

1. A touch screen usable for realizing 3D display, comprising:
    an upper substrate and a lower substrate cell-assembled; and
    liquid crystal, filled between the upper substrate and the lower substrate,
    wherein the upper substrate comprises: an upper transparent substrate and a transparent conductive layer disposed on a side of the upper transparent substrate facing the lower substrate, and the upper substrate is configured to be touched directly in operation;
    the lower substrate comprises: a lower transparent substrate and a first sensing electrode layer, an insulating layer and a second sensing electrode layer sequentially disposed on a side of the lower transparent substrate facing the upper substrate,
    wherein the first sensing electrode layer comprises a plurality of first sensing electrodes, the second sensing electrode layer comprises a plurality of second sensing electrodes that cross over the first sensing electrodes, both the first sensing electrodes and the second sensing electrodes are of stripe-like electrodes, the second sensing electrodes are disposed vertically, and the insulating layer is configured to insulate the first sensing electrodes and the second sensing electrodes, to thus form touch sensing capacitors;
    and the transparent conductive layer has a stripe shape and has a plurality of protrusions at locations where the transparent conductive layer directly corresponds to the second sensing electrodes of the lower substrate, the plurality of protrusions are formed integrally with the transparent conductive layer and are formed into circular bosses.

2. The touch screen claimed as claim 1, wherein the stripe-like transparent conductive layer corresponds to the second sensing electrodes of the lower substrate in position.

3. The touch screen claimed as claim 1, wherein the first sensing electrodes are perpendicular to the second sensing electrodes.

4. The touch screen claimed as claim 1, wherein the upper substrate further comprises an insulating layer, and the transparent conductive layer is disposed between the insulating layer and the upper transparent substrate.

5. The touch screen claimed as claim 1, wherein the lower substrate further comprises an alignment layer, and the first sensing electrode layer, the insulating layer and the second sensing electrode layer are disposed between the alignment layer and the lower transparent substrate in this order.

6. A display device, comprising the touch screen claimed as claim 1.

7. A manufacturing method of the touch screen claimed as claim 1, comprising:
    manufacturing a transparent conductive layer on an upper transparent substrate, so as to attain an upper substrate, wherein the upper substrate is configured to be touched directly in operation;
    manufacturing a first sensing electrode layer, an insulating layer and a second sensing electrode layer on a lower transparent substrate in sequence, so as to attain a lower substrate, wherein the first sensing electrode layer comprises a plurality of first sensing electrodes, the second sensing electrode layer comprises a plurality of second sensing electrodes that cross over the first sensing electrodes, both the first sensing electrodes and the second sensing electrodes are of stripe-like electrodes, and the second sensing electrodes are disposed vertically;
    cell-assembling the upper substrate and the lower substrate to form a cell and filling liquid crystal into the cell, so that the touch screen is formed, wherein a side of the upper transparent substrate on which the transparent electrode layer is formed faces a side of the lower transparent substrate on which the first sensing electrode layer, the insulating layer and the second sensing electrode layer are formed;
    wherein the transparent conductive layer has a stripe shape and has a plurality of protrusions provided at locations where the transparent conductive layer directly corresponds to the second sensing electrodes of the lower substrate, the plurality of protrusions are formed integrally with the transparent conductive layer and are formed into circular bosses.

8. The manufacturing method claimed as claim 7, wherein the manufacturing the transparent conductive layer on the upper transparent substrate so as to attain the upper substrate further comprises:
    providing an insulating layer on the transparent conductive layer of the upper transparent substrate.

9. The manufacturing method claimed as claim 7, wherein the manufacturing the first sensing electrode layer, the insulating layer and the second sensing electrode layer on the lower transparent substrate so as to attain the lower substrate further comprises:
provided an alignment layer on the lower transparent substrate on which the first sensing electrode layer, the insulating layer and the second sensing electrode layer are formed.

10. The manufacturing method claimed as claim 7, wherein the first sensing electrodes cross over the second sensing electrode layer, and the insulating layer is configured to insulate the first sensing electrodes and the second sensing electrodes.

11. The manufacturing method claimed as claim 7, wherein the transparent conductive layer in the stripe shape corresponds to the second sensing electrodes of the lower substrate.

\* \* \* \* \*